(12) United States Patent
Kim

(10) Patent No.: US 7,637,514 B2
(45) Date of Patent: Dec. 29, 2009

(54) MOUNTING STRUCTURE OF A REAR SUSPENSION CROSS MEMBER OF A VEHICLE

(75) Inventor: Ki Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 280 days.

(21) Appl. No.: 11/725,057

(22) Filed: Mar. 16, 2007

(65) Prior Publication Data

US 2008/0143071 A1    Jun. 19, 2008

(30) Foreign Application Priority Data

Dec. 14, 2006    (KR) ...................... 10-2006-0128117

(51) Int. Cl.
    *B62D 25/20* (2006.01)
(52) U.S. Cl. ............... 280/124.109; 280/781; 280/785; 280/800; 296/203.04; 296/204; 403/232.1; 403/387; 403/388; 180/312
(58) Field of Classification Search .......... 280/124.109, 280/781, 785, 800; 296/203.04, 204; 403/232.1, 403/387, 388
    See application file for complete search history.

(56) References Cited

U.S. PATENT DOCUMENTS

| 5,005,857 | A | * | 4/1991 | Camuffo | 280/124.109 |
|---|---|---|---|---|---|
| 5,364,128 | A | * | 11/1994 | Ide | 280/784 |
| 5,385,369 | A | * | 1/1995 | Mukai et al. | 280/788 |
| 5,947,518 | A | * | 9/1999 | Redman et al. | 280/781 |
| 6,349,953 | B1 | * | 2/2002 | Yoshihira et al. | 280/124.109 |
| 6,398,292 | B2 | * | 6/2002 | Tsuruta et al. | 296/187.09 |
| 6,702,309 | B2 | * | 3/2004 | Cho | 280/124.166 |
| 2003/0160415 | A1 | * | 8/2003 | Kim | 280/124.109 |
| 2005/0062316 | A1 | * | 3/2005 | Kim | 296/204 |
| 2005/0258628 | A1 | * | 11/2005 | Belzile | 280/781 |
| 2006/0197300 | A1 | * | 9/2006 | Nakashima et al. | 280/124.109 |

FOREIGN PATENT DOCUMENTS

DE    10252616 A1  *  9/2003

* cited by examiner

*Primary Examiner*—Ruth Ilan
*Assistant Examiner*—James English
(74) *Attorney, Agent, or Firm*—Morgan, Lewis & Bockius LLP

(57) ABSTRACT

A rear suspension cross member mounting structure includes a rear floor side member with a 4WD rear cross member mounting hole and a 2WD rear cross member mounting hole, and a reinforcement bracket with a slot corresponding to both the 4WD rear cross member mounting hole and the 2WD rear cross member mounting hole. The structure may further include a bolt, passing through the reinforcement bracket and the rear floor side member to attach the rear cross member to the structure. The bolt may pass sequentially through the reinforcement bracket, the rear floor side member, and the rear cross member, and then engage with a nut provided below the rear cross member.

3 Claims, 2 Drawing Sheets

MOUNTING STRUCTURE OF A REAR SUSPENSION CROSS MEMBER OF A VEHICLE

CROSS-REFERENCE TO RELATED APPLICATION

This application claims priority to and the benefit of Korean Patent Application No. 10-2006-0128117 filed in the Korean Intellectual Property Office on Dec. 14, 2006, the entire contents of which are incorporated herein by reference.

BACKGROUND OF THE INVENTION (a) Field of the Invention

The present invention relates to a mounting structure of a rear suspension cross member of a vehicle.

(b) Description of the Related Art

Typically, one rear floor side member is attached to each side a rear floor panel of a vehicle body. In order to improve strength of the vehicle body and to enable mounting of a rear suspension, a rear suspension cross member is attached to the left and right rear floor side members.

For several vehicle models, both two wheel drive (2WD) and four wheel drive (4WD) versions are manufactured. In this case, different types of rear suspension cross members should be applied to the same vehicle body type depending on the type of drive train.

For a 4WD vehicle, two rear suspension cross members are employed with wide spacing therebetween. A pipe nut is applied to a rear floor panel of the rear suspension side member. Each 4WD rear suspension cross member is attached to the rear floor side member by a bolt that penetrates the cross member from its bottom and is engaged with the pipe nut.

For a 2WD vehicle, a single rear suspension cross member is employed. In this case also, a pipe nut is applied to the rear floor panel of the rear suspension side member. The 2WD rear suspension cross member is attached to the rear floor side member by two bolts that penetrate the cross member from its bottom and are engaged with the pipe nut.

In order to manufacture both 2WD and 4WD vehicles with a single vehicle body structure (i.e. to utilize the same rear suspension side member for either case), four bolt holes are provided on the rear suspension side member.

The cross-sectional shape of the rear suspension side member varies along its length. Therefore, the pipe nut is produced in as many as four different shapes so as to correspond to the four different positions of the bolt holes.

This means that an excessive number of parts are employed in order to manufacture both 2WD and 4WD vehicles with the same vehicle body structure.

Therefore, if a rear suspension cross member mounting structure can be improved such that the number of parts may be reduced while the manufacturing of both the 2WD and 4WD vehicles becomes easier, simplification of the assembly process and reduction of manufacturing cost can be achieved. Also, this may reduce human errors in the assembly process, e.g., assembling a 4WD part to a 2WD vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

A rear suspension cross member mounting structure according to an exemplary embodiment of the present invention includes a rear floor side member with a 4WD rear cross member mounting hole and a 2WD rear cross member mounting hole, and a reinforcement bracket with a slot corresponding to both the 4WD rear cross member mounting hole and the 2WD rear cross member mounting hole.

The structure may further include a bolt, passing through the reinforcement bracket and the rear floor side member to attach the rear cross member to the structure. The bolt may pass sequentially through the reinforcement bracket, the rear floor side member, and the rear cross member, and then engage with a nut provided below the rear cross member.

DESCRIPTION OF REFERENCE NUMERALS INDICATING PRIMARY ELEMENTS IN THE DRAWINGS

Figure 1:
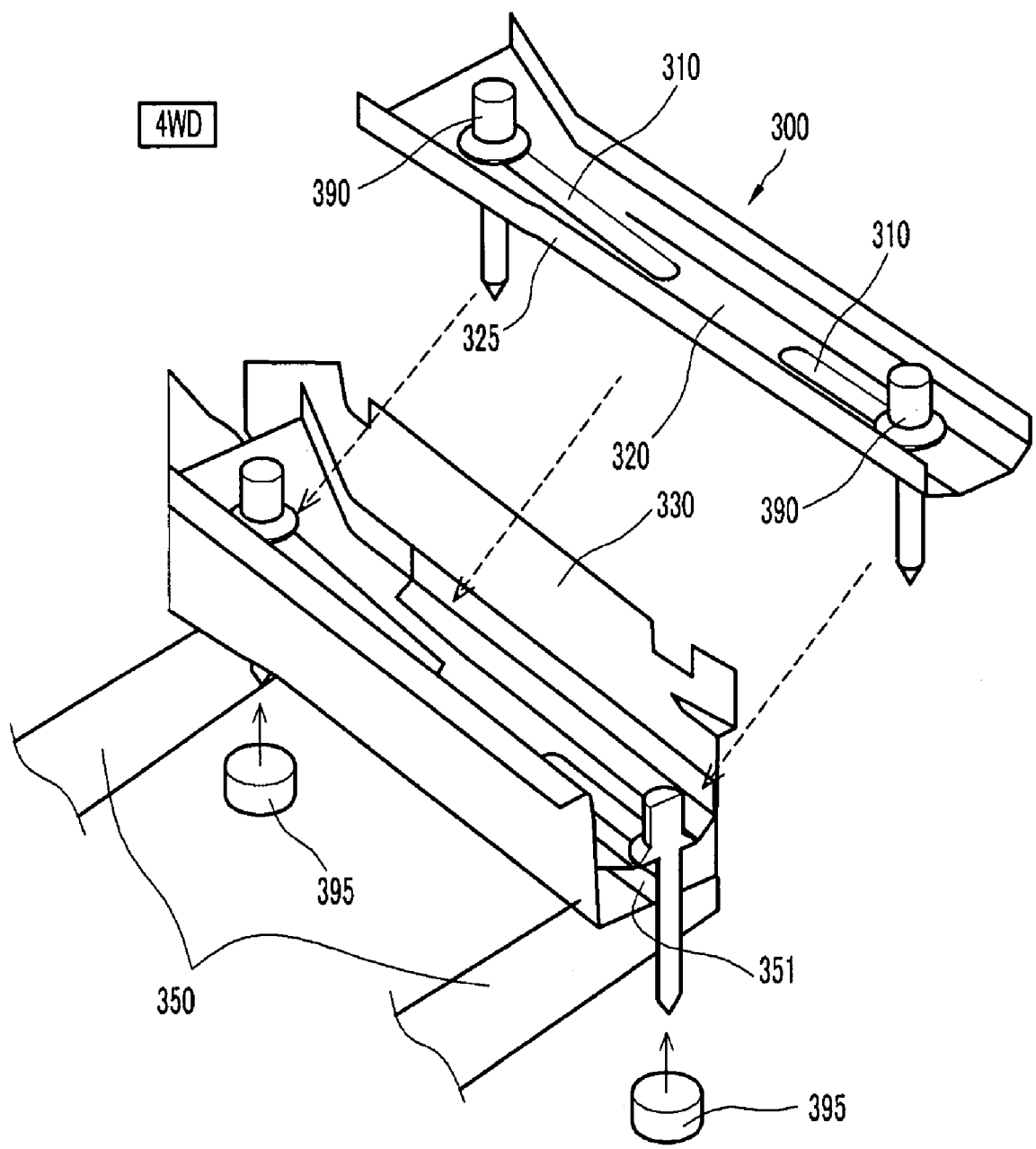
FIG. 1 is a perspective view showing a mounting structure of a 4WD rear suspension cross member according to an exemplary embodiment of the present invention.
Figure 2:
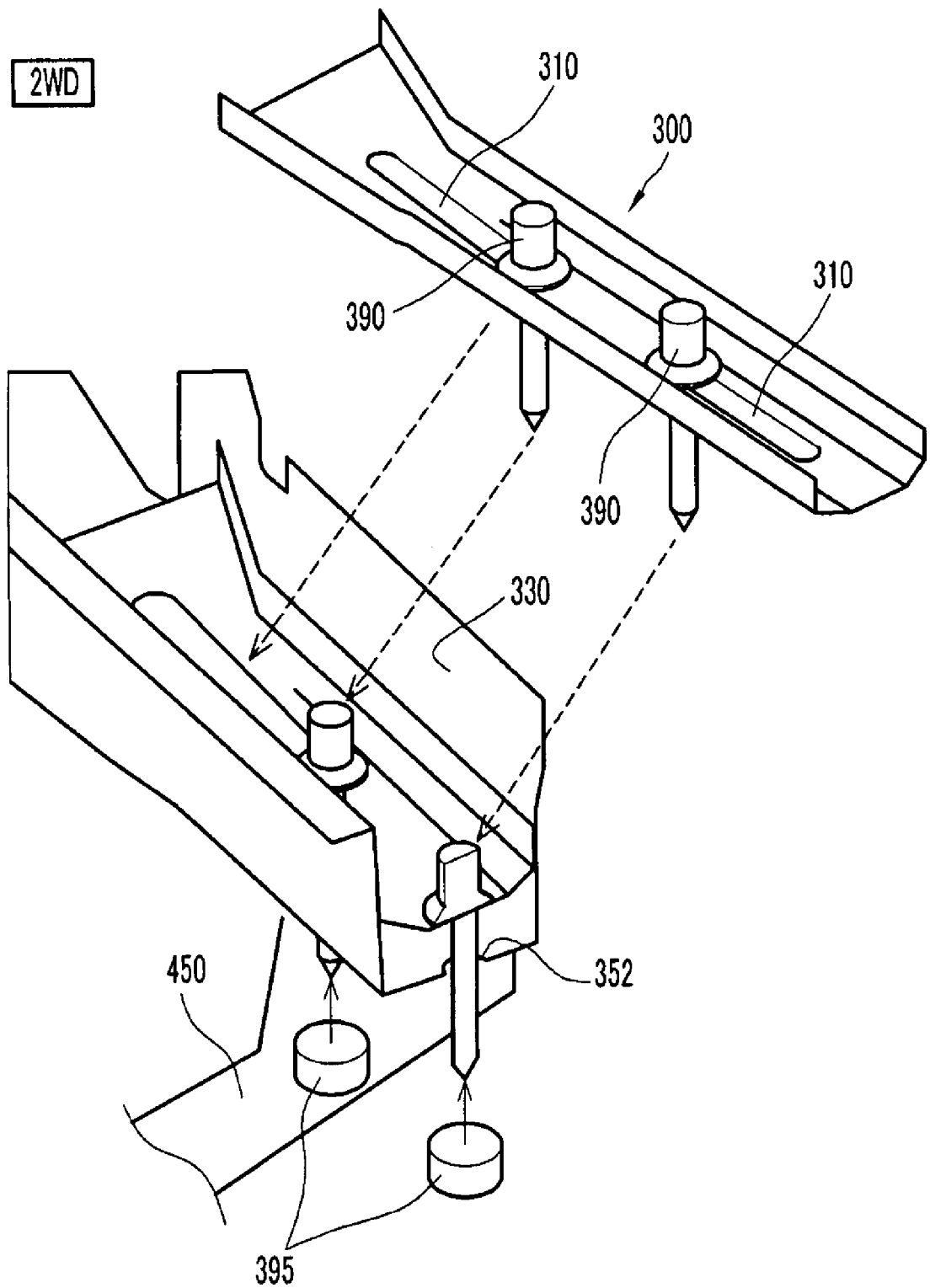
FIG. 2 is a perspective view showing a mounting structure of a 2WD rear suspension cross member according to an exemplary embodiment of the present invention.

300: reinforcement bracket
310: slot
320: bottom panel
325: wall
330: rear suspension side member
350: 4WD rear suspension cross member
390: bolt
395: nut
450: 2WD rear suspension cross member

DETAILED DESCRIPTION OF THE PREFERRED EMBODIMENTS

An exemplary embodiment of the present invention will hereinafter be described in detail with reference to the accompanying drawings.

A rear suspension cross member mounting structure of a vehicle according to an exemplary embodiment of the present invention enables easy mounting of either a 4WD rear cross member 350 or a 2WD rear cross member 450 through the same reinforcement bracket 300.

A rear cross member mounting structure according to an exemplary embodiment of the present invention includes a rear cross member 350 for a 4WD vehicle, or a rear cross member 450 for a 2WD vehicle. The structure also includes a rear floor side member 330, and a reinforcement bracket 300.

The rear floor side member 330 is provided with both a 4WD rear cross member mounting hole 351 for mounting the 4WD rear cross member 350 and a 2WD rear cross member mounting hole 352 for mounting the 2WD rear cross member 450. The rear cross member 350 or 450 is mounted to the rear floor side member 330 at its lower side.

The reinforcement bracket 300 is disposed above the rear floor side member 330, and provided with slots 310 corresponding to both the 4WD rear cross member mounting hole 351 and the 2WD rear cross member mounting hole 352.

The reinforcement bracket 300 includes a bottom panel 320 and walls 325. The reinforcement adapter bracket 330 is firmly contained within the side member 330 through the walls 325.

The rear cross member 350 or 450 is assembled to the rear floor side member 330 at its bottom by a bolt 390 penetrating the reinforcement bracket 300 and the rear floor side member 330. In more detail, the bolt 390 is inserted into the reinforcement bracket 300 from above, and then sequentially passes through the reinforcement bracket 300, the rear floor side member 330, and the rear cross member 350 or 450. Then, the bolt 390 engages with a nut 395 provided below the rear cross member 350 or 450.

The slot 310 overlaps both of the 4WD rear cross member mounting hole 351 and the 2WD rear cross member mounting hole 352. Therefore, the position of the bolt 390 in the slot 310 only changes depending on whether the rear cross member to be mounted is the 4WD rear cross member 350 or the 2WD rear cross member 450. Therefore, 2WD and 4WD vehicles may be manufactured without any redundant parts.

According to an exemplary embodiment of the present invention, two versions of rear cross members for 4WD and 2WD vehicles can be selectively mounted to a rear suspension side member by using a minimal number of parts. Therefore, simplification of the manufacturing process and reduction of cost may be realized due to a reduction of the number of parts.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rear suspension cross member mounting structure, comprising:
    a rear floor side member comprising a four-wheel-drive (4WD) rear cross member mounting hole and a two-wheel-drive (2WD) rear cross member mounting hole; and
    a reinforcement bracket comprising a slot corresponding to both the 4WD rear cross member mounting hole and the 2WD rear cross member mounting hole.

2. The rear suspension cross member mounting structure of claim 1, further comprising a bolt configured to pass through the reinforcement bracket and the rear floor side member to attach a rear cross member to the structure.

3. The rear suspension cross member mounting structure of claim 2, wherein the bolt is configured to pass sequentially through the reinforcement bracket, the rear floor side member, and the rear cross member, and then engage with a nut provided below the rear cross member.

* * * * *